United States Patent
Péan et al.

(10) Patent No.: US 11,573,884 B2
(45) Date of Patent: Feb. 7, 2023

(54) TECHNIQUES FOR TRANSPARENTLY EMULATING NETWORK CONDITIONS

(71) Applicant: NETFLIX, INC., Los Gatos, CA (US)

(72) Inventors: Grégoire Péan, San Francisco, CA (US); Benoit Fontaine, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/460,016

(22) Filed: Aug. 27, 2021

(65) Prior Publication Data

US 2021/0390035 A1    Dec. 16, 2021

Related U.S. Application Data

(63) Continuation of application No. 16/749,917, filed on Jan. 22, 2020, now Pat. No. 11,106,566.

(51) Int. Cl.
| | |
|---|---|
| G06F 11/36 | (2006.01) |
| G06F 9/455 | (2018.01) |
| H04L 43/08 | (2022.01) |
| H04L 43/50 | (2022.01) |
| H04L 47/22 | (2022.01) |
| H04L 67/00 | (2022.01) |
| H04L 61/4511 | (2022.01) |

(52) U.S. Cl.
CPC ...... *G06F 11/3664* (2013.01); *G06F 9/45508* (2013.01); *H04L 43/08* (2013.01); *H04L 43/50* (2013.01); *H04L 47/22* (2013.01); *H04L 61/4511* (2022.05); *H04L 67/34* (2013.01)

(58) Field of Classification Search
CPC .................................................... G06F 11/36
See application file for complete search history.

(56) References Cited

U.S. PATENT DOCUMENTS

| | | | |
|---|---|---|---|
| 7,296,080 B2 | 11/2007 | Rowley et al. | |
| 9,660,895 B1 | 5/2017 | Bennett | |
| 10,375,155 B1* | 8/2019 | Cai | ..................... H04L 41/0896 |
| 2008/0225853 A1* | 9/2008 | Melman | .................. H04L 12/46 370/392 |
| 2008/0232264 A1 | 9/2008 | Horovilz et al. | |
| 2011/0282642 A1 | 11/2011 | Kruger et al. | |
| 2017/0214597 A1* | 7/2017 | Zhang | ..................... H04L 45/70 |
| 2018/0219788 A1 | 8/2018 | Wackerly | |

* cited by examiner

*Primary Examiner* — Jae U Jeon
(74) *Attorney, Agent, or Firm* — Artegis Law Group, LLP

(57) ABSTRACT

In various embodiments, a network emulation application emulates network conditions when testing a software application. In response to a request to emulate a first set of network conditions for a first client device that is executing the software application, causing a kernel to implement a first pipeline and to automatically input network traffic associated with the first client device to the first pipeline instead of a default bridge. In response to a request to emulate a second set of network conditions for a second client device that is executing the software application, causing the kernel to implement a second pipeline and to automatically input network traffic associated with the second client device to the second pipeline instead of the default bridge. Each of the pipelines perform one or more traffic shaping operations on at least a subset of the network traffic input into the pipeline.

20 Claims, 6 Drawing Sheets

TECHNIQUES FOR TRANSPARENTLY EMULATING NETWORK CONDITIONS

CROSS-REFERENCE TO RELATED APPLICATIONS

This application is a continuation of the co-pending U.S. patent application titled, "TECHNIQUES FOR TRANSPARENTLY EMULATING NETWORK CONDITIONS," filed on Jan. 22, 2020 and having Ser. No. 16/749,917. The subject matter of this related application is hereby incorporated herein by reference.

BACKGROUND

Field of the Various Embodiments

The various embodiments relate generally to computer networking and, more specifically, to techniques for transparently emulating network conditions.

Description of the Related Art

When developing a software application that communicates with various devices across one or more networks, testing the performance of the software application across the different networks over which the software application is likely to be deployed is desirable. In most cases, however, executing a software application over an actual real-world network for testing purposes is impractical. Accordingly, application developers oftentimes use network emulation to test software applications under network conditions that mimic the network conditions normally seen in various real-world networks.

In one approach to network emulation, an emulation application executing on an emulation server divides a high-capacity network into multiple smaller networks referred to as "subnets." Each subnet connects a different device that executes a different instance of a software application to the emulation server and is intended to mimic a different set of network conditions. As the different instances of the software application execute, the emulation application routes data related to the software application between the devices on the subnets and other devices on the high-capacity network. When receiving or transmitting data via a subnet, the emulation application implements "traffic shaping" operations that selectively delay some of the transmissions to replicate the set of network conditions associated with the subnet.

One drawback of subnet-based network emulation is that creating subnets necessarily changes the topology of the high-capacity network and can inadvertently impact the behavior of the instances of the software application executing on the devices on the subnets. As a result, the performance of the software application executing on a given device may not accurately reflect what the performance of the software application would actually be when connected to a real-world network having the associated set of network conditions. For example, as a result of the subnetting, the devices executing the software application would receive all data from the emulation server instead of from the device that originally transmitted the data. Consequently, the software application would be unable to properly perform any operations that require identifying the device that originally transmitted the data.

Another drawback of subnet-based network emulation is that enabling the device on each subnet to communicate with other devices on the high-capacity network requires port forwarding. In port forwarding, the internal logical address that identifies the device on the associated subnet needs to be redirected to an external logical address that identifies the device on the high-capacity network. Configuring and maintaining port forwarding for a large number of devices can require prohibitive amounts of time and effort.

As the foregoing illustrates, what is needed in the art are more effective techniques for emulating network conditions when testing software applications.

SUMMARY

One embodiment sets forth a computer-implemented method for emulating network conditions when testing a software application. The method includes, in response to a first request to emulate a first set of network conditions for a first client device that is executing the software application, causing a kernel to implement a first pipeline that performs at least a first traffic shaping operation on a first subset of network traffic input into the first pipeline; causing the kernel to automatically input network traffic associated with the first client device to the first pipeline instead of a default bridge; in response to a second request to emulate a second set of network conditions for a second client device that also is executing the software application, causing the kernel to implement a second pipeline that performs at least a second traffic shaping operation on a second subset of network traffic input into the second pipeline; and causing the kernel to automatically input network traffic associated with the second client device to the second pipeline instead of the default bridge.

At least one technical advantage of the disclosed techniques relative to the prior art is that the disclosed techniques can be used to more accurately emulate the behavior of a software application when connected to different real-world networks. In that regard, because the topology of the network connecting the software application to the network devices is not changed, the behavior of the software application executing on a client device reliably mimics the behavior of the software application on a real-world network having the associated network conditions. Further, unlike subnet-based approaches to network emulation, with the disclosed techniques, each client device is identified with a single logical address instead of both an internal logical address and an external logical address. Consequently, port forwarding is not required, which reduces both the time and effort required to emulate each real-world network. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
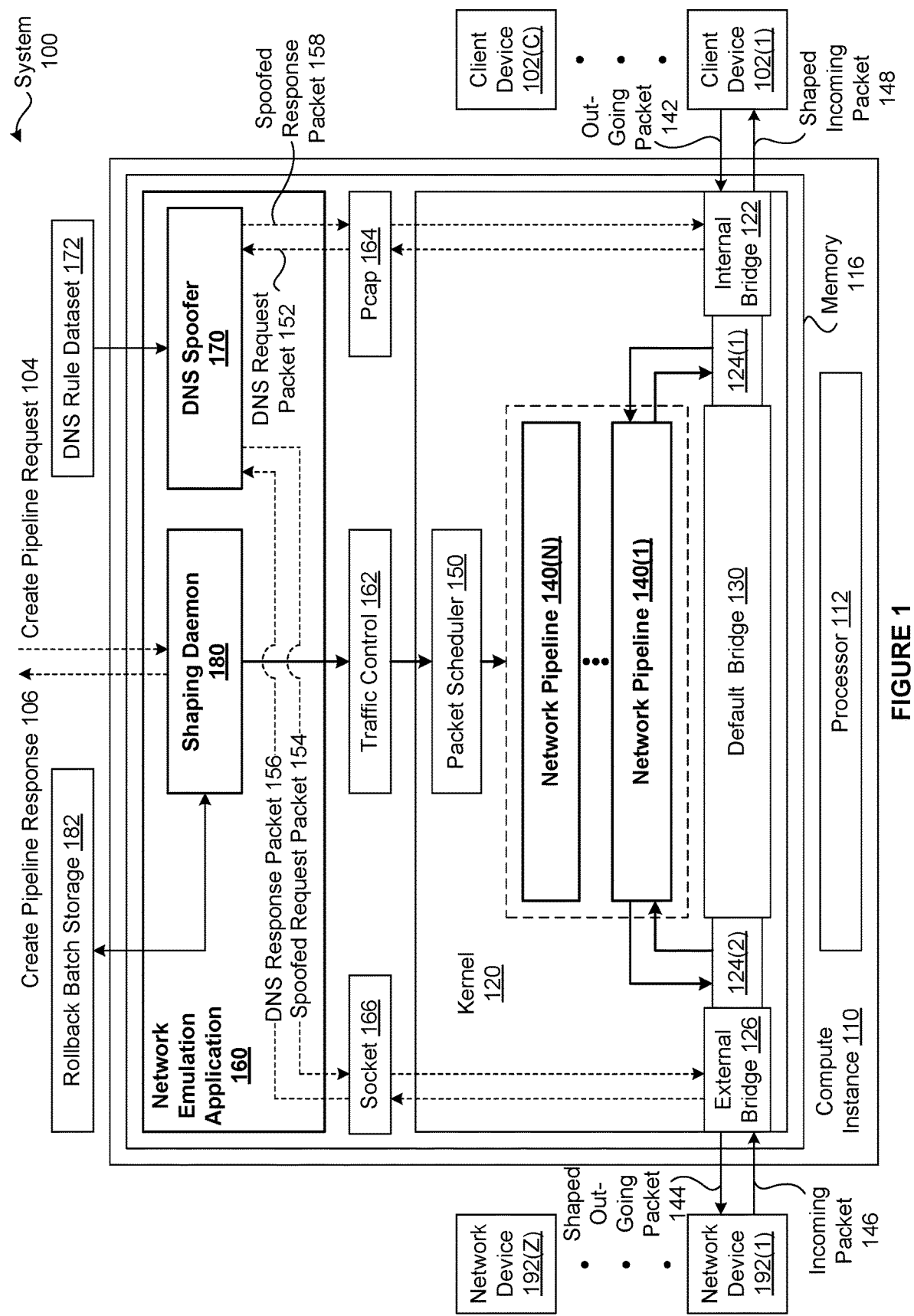
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

A typical media streaming service provides access to a library of media content items that can be selected and/or viewed via a software application that executes on a range of different client devices. Because each client device can communicate with the media streaming service via a different network, testing the performance of the software application across the different networks over which client devices are likely to connect to the media streaming service is desirable. In most cases, however, executing a software application over an actual real-world network for testing purposes is impractical. Instead, network emulation can be used to test the software application under network conditions that mimic the network conditions normally seen in various real-world networks.

In one approach to network emulation, an emulation application executing on an emulation server divides a high-capacity network into multiple subnets. Each subnet connects a different "client" device that executes a different instance of a software application to the emulation server and is intended to mimic a different set of network conditions that is associated with a different real-world network. When receiving or transmitting data via a subnet, the emulation application implements "traffic shaping" operations that selectively delay some of the transmissions to replicate the set of network conditions associated with the subnet.

One drawback of the above approach is that creating subnets necessarily changes the topology of the high-capacity network and can inadvertently impact the behavior of the instances of the software application executing on the client devices on the subnets. As a result, the performance of the software application executing on a given device may not accurately reflect what the performance of the software application would actually be when connected to the associated real-world network.

Another drawback of the above approach is that enabling the client devices to communicate with other "network" devices on the high-capacity network requires port forwarding. In port forwarding, the internal logical address that identifies the client device on the associated subnet needs to be redirected to an external logical address that identifies the client device to the network devices on the high-capacity network. Configuring and maintaining port forwarding for a large number of client devices can require substantial amounts of time and effort.

With the disclosed techniques, a physical or virtual "bridging" device is configured to implement filtering operations that segregate network traffic into different categories and then independently modify each category of network traffic to emulate a different set of network conditions. In one embodiment, the bridging device implements a default bridge that connects any number of client devices and network devices via a single network. A network emulation application executing on the bridging device includes, without limitation, a shaping daemon and a Domain Name Service ("DNS") spoofer. The DNS is the mechanism that allows users to refer to websites, devices, and services via intuitive domain names, such as "example.com," when communicating over the Internet. For explanatory purposes, the network traffic that communicates information associated with the DNS is referred to herein as "DNS traffic" and the remaining network traffic is referred to herein as "non-DNS traffic."

In operation, the shaping daemon receives a different pipeline setup command for each client device. Each pipeline setup command defines how the non-DNS network traffic for the associated client device is to be altered to mimic a different set of network conditions. For each pipeline setup command, the shaping daemon configures the operating system ("OS") of the bridging device to create a different network pipeline of traffic shaping commands. Each network pipeline alters any network traffic that passes through the network pipeline in either direction to mimic the associated set of network conditions. For each client device, the shaping daemon configures the OS to perform filtering operations that transparently redirect the associated non-DNS network traffic from the default bridge to the associated network pipeline. As software applications subsequently execute on the client devices, the bridging device automatically modifies the non-DNS network traffic associated with each client device to emulate the associated set of network conditions.

In a complementary fashion, the network emulation application initially configures the bridging device to automatically and continually redirect DNS traffic from the OS to the DNS spoofer. The DNS spoofer can modify all aspects of DNS traffic based on a DNS rule set. As software applications subsequently execute on the client devices, the bridging device automatically modifies the DNS network traffic associated with each client device, thereby enabling the associated set of network conditions to be emulated for all network traffic.

At least one technical advantage of the disclosed techniques relative to the prior art is that the network emulation application can be used to more accurately emulate the behavior of a software application when connected to different real-world networks. In particular, because the topology of the network connecting the software application to the network devices is not changed, the behavior of the software application is less likely to be inadvertently impacted by the emulation process. Furthermore, because port forwarding is not required, the time and effort required to emulate each real-word network is reduced. These technical advantages provide one or more technological advancements over prior art approaches.

System Overview

FIG. 1 is a conceptual illustration of a system 100 configured to implement one or more aspects of the various embodiments. The system 100 includes, without limitation, a compute instance 110, any number of client devices 102, any number of network devices 192, a rollback batch storage 182, and a Domain Name Service ("DNS") rule dataset 172. In alternate embodiments, the rollback batch storage 182 and/or the DNS rule dataset 172 may be omitted from the system 100. For explanatory purposes, multiple instances of like objects are denoted with reference numbers identifying the object and parenthetical alphanumeric characters identifying the instance where needed.

Any number of the components of the system 100 may be distributed across multiple geographic locations or implemented in one or more cloud computing environments (i.e., encapsulated shared resources, software, data, etc.) in any combination. In various embodiments, the system 100 may include any number of compute instances 110 in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

The compute instance 110 is configured to implement one or more applications or subsystems of applications. For explanatory purposes only, each application is depicted as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110 is configured to facilitate the testing of an "application under test" under different sets of emulated network conditions. Notably, the compute instance 110 may be a physical compute instance 110 or a virtual compute instance 110. The application under test may be any software application, and a different instance of the application under test executes on each of any number of client devices 102. As the application under test executes, the application under test communicates with any number of network devices 192. Each of the client devices 102 and the network devices 192 may be any type of device that is capable of executing software applications and communicating with other devices via a network. For example, the client device 102 could be a tablet, a set-top box, a smart television, a game console, a streaming media player, a mobile device such as a smart phone, etc. In alternate embodiments, any number of applications under test may execute on the client devices 102.

As described previously herein, one conventional approach to emulating network conditions involves partitioning a high-capacity network into multiple subnets, where each subnet connects a different client device to a conventional emulation server and is associated with a different set of network conditions. When receiving or transmitting data via a subnet, the conventional emulation application implements traffic shaping operations that selectively delay some of the transmissions to replicate the associated set of network conditions.

As persons skilled in the art will recognize, creating subnets changes the topology of the network at layer 2 (the Network Layer) of the Open Systems Interconnection ("OSI") model. At the Network layer, each device on a network is associated with one or more logical addresses, such as IP addresses, and each subnet has a different non-overlapping range of logical addresses. As part of creating each subnet, the external IP address that identifies the associated client device to the network device is mapped to an internal IP address that identifies the client device on the associated subnet.

One drawback of subnet-based network emulation is that changing the network topology can inadvertently impact the behavior of the software applications executing on the client devices. As a result, the performance of software applications executing on the client devices may not accurately reflect what the performance of the software applications would actually be when connected to a real-world network having the associated set of network conditions. Another drawback of subnet-based network emulation is that enabling each client device to communicate with network devices requires port forwarding. In port forwarding, the internal logical addresses need to be redirected to external logical addresses. Configuring and maintaining port forwarding for a large number of client devices typically involves substantial amounts of time and effort.

Transparently Emulating Network Conditions

To more accurately and efficiently perform network emulation for the application under test, the compute instance 110 includes, without limitation, a network emulation application 160 that creates a flexible filtering/shaping topology at layer 2 (the Data Link Layer) of the OSI model. The Data Link Layer provides a means for data to be sent in the form of packets, where each packet is a discrete portion of data. At the Data Link Layer, each device on the network has an address known as the Media Access Control ("MAC") address. The MAC address is a hardware address that is assigned to the device at the factory.

The compute instance 110 is configured to implement a network bridge at layer 2 (the Data Link Layer) of the OSI model. A network bridge seamlessly merges separate physical networks that all have the same range of logical addresses into a single network and is transparent to (i.e., not detectable by) the client devices 102 and the application under test. In operation, the network emulation application 160 configures the network bridge to filter/shape the network traffic associated with the client devices 102. The network traffic associated with the client device 102($x$) includes, without limitation, outgoing packets 142 that are transmitted from the client device 102($x$) to the network devices 192 and incoming packets 146 that are transmitted from the network devices 192 to the client device 102($x$).

Some of the packets included in the network traffic associated with the client devices 102 communicate information associated with the DNS. The DNS is the part of the Internet infrastructure that translates human-readable domain names into Internet Protocol ("IP") addresses. IP addresses are the logical addresses used to establish communication over the Internet. The DNS is the mechanism that allows users to refer to websites, devices, and services via intuitive domain names, such as "example.com," rather than the actual numeric IP addresses, e.g., 192.0.2.78, that are associated with different websites, devices, and services. The DNS traffic includes, without limitation, any number of DNS request packets 152 that communicate information requesting DNS information from DNS servers, and any number of DNS response packets 156 that return information from DNS servers. As persons skilled in the art will recognize, unlike emulating non-DNS traffic, properly emulating DNS traffic can involve modifying the actual packets. For instance, properly emulating some types of DNS requests involves modifying any number of fields of the DNS request packet 152 and subsequently modifying any number of fields of any associated DNS response packet 156.

To accurately emulate all network traffic, the network emulation application 160 includes, without limitation, a shaping daemon 180 that shapes and filters the non-DNS traffic associated with the client devices 102 and a DNS spoofer 170 that modifies the DNS traffic associated with the client devices 102. The shaping daemon 180 uses features of a kernel 120 included in the compute instance 110 to filter and shape the non-DNS network traffic associated with the client devices 102. The kernel 120 is the part of the operating system of the compute instance 110 that provides services required by other parts of the OS and software applications. The kernel 120 executes and provides services in a portion of the memory 116 that is referred to as "kernel space." By contrast, other software applications, including the network emulation application 160 and the DNS spoofer 170, execute in the remaining portion of the memory 116 that is referred to as "user space."

Some examples of typical responsibilities of the kernel 120 include, without limitation, managing memory, managing processes and tasks, managing disks, and connecting the hardware of the compute instance 110 to software applications executing on the compute instance 110. In particular, the kernel 120 includes, without limitation, a packet scheduler 150 that determines the order in which packets are serviced (i.e., transmitted) or dropped.

During an initialization process, the network emulation application 160 configures the kernel 120 to implement a default bridge 130. The default bridge 130 is a network bridge that does not shape network traffic. As shown for the client device 102(1), each of the client devices 102 is connected to the default bridge 130 via an internal bridge 122 and a virtual network interface pair 124(1). As shown for the network device 192(1), each of the network devices 192 is connected to the default bridge 130 via an external bridge 126 and the virtual network interface pair 124(2). The network emulation application 160 may configure the default bridge 130, the internal bridge 122, the virtual network interface pairs 124, and the external bridge 126 in any technically feasible fashion. In alternate embodiments, the architecture with which the client devices 102 and the network devices 192 connect to the computer instance 110, the kernel 120, and the default bridge 130 may vary.

During the initialization process, the network emulation application 160 also starts the shaping daemon 180. As described in greater detail in conjunction with FIG. 2, the shaping daemon 180 uses Linux features to configure the kernel 120 to implement any number of network pipelines 140. Although not shown in FIG. 1, each network pipeline 140 implements a composite shaping policy and includes, without limitation, at least one stage, a traffic filter, and a priority. Each stage implements at least one shaping policy and may specify any number (including zero) of filter(s) that limit the network traffic to which the associated shaping policies pertain. As referred to herein, a shaping policy may specify any number and types of actions that impact network traffic. For instance, a shaping policy may delay packets, drop packets, limit the bandwidth of network traffic, etc. A filter may specify, without limitation, matching traffic in any technically feasible fashion based on any amount of data, such as a direction, a device port, an action to determine the match, etc.

The traffic filter specifies the packets to which the associated network pipeline 140 pertains. In some embodiments, each traffic filter specifies a different client device 102, and each network pipeline 140 therefore pertains to the outgoing packets 142 and the incoming packets 146 associated with a different client device 102. Because any number of network pipelines 140 can pertain to the same packet, the priority is used to establish a hierarchy for the network pipelines 140. For explanatory purposes only, if a network pipeline 140 pertains to a particular packet, then the packet is referred to as "matching" the network pipeline 140. If a packet matches multiple network pipelines 140, then the kernel 120 sends the packet through the matching network pipeline 140 that has the highest priority instead of the default bridge 130. If a packet matches only one network pipeline 140, then the kernel 120 sends the packet through the matching network pipeline 140 instead of the default bridge 130. If a packet matches none of the network pipelines 140, then the kernel 120 sends the packet through the default bridge 130.

The shaping daemon 180 configures the kernel 120 to implement new network pipelines 140 on-demand based on create pipeline requests 104 received via a representational state transfer ("REST") application programming interface ("API"). In alternate embodiments, the shaping daemon 180 may receive the create pipeline requests 104 in any technically feasible fashion, such as from a user interface ("UI"). Upon receiving a create pipeline request 104, the shaping daemon 180 generates a setup batch of setup commands that, together, are designed to generate and connect a new network pipeline 140(x) as per the create pipeline request 104.

The shaping daemon 180 sequentially transmits each of the setup commands in the setup batch to a traffic control 162. The traffic control 162 is commonly referred to as "tc" and is a Linux user-space utility program used to configure the packet scheduler 150. If the traffic control 162 successfully configures the packet scheduler 150 as per a setup command, then the shaping daemon 180 prepends an undo command that reverses the setup command to a rollback batch. If, however, the traffic control 162 does not successfully configure the packet scheduler 150 as per the setup command, then the shaping daemon 180 sequentially executes each of the undo commands in the rollback batch and transmits a create pipeline response 106 indicating failure to the caller associated with the create pipeline request 104.

If the traffic control 162 successfully executes all of the setup commands in the setup batch and therefore successfully generates and connects the network pipeline 140(x), then the shaping daemon 180 transmits a create pipeline response 106 indicating success to the caller associated with the create pipeline request 104. The shaping daemon 180 then stores the rollback batch in the rollback batch storage 182. The rollback batch storage 182 may be any type of persistent storage.

Subsequently, the shaping daemon 180 determines whether the network pipeline 140(x) specifies the same traffic filter as any one of the other network pipelines 140(j) and, consequently, is a replacement for the network pipeline 140(j). If the shaping daemon 180 determines that the network pipeline 140(x) is a replacement for the network pipeline 140(j), then the shaping daemon 180 retrieves the "obsolete" rollback batch associated with the network pipeline 140(j) from the rollback batch storage 182 and configures a background process to cleanly terminate the network pipeline 140(j).

More specifically, the shaping daemon 180 configures the background process to wait for a grace period, run the obsolete rollback batch, and then delete the obsolete rollback batch from the rollback batch storage 182. The grace period is selected to allow any packets that are passing through the network pipeline 140(j) to finish passing through the network pipeline 140(j) before the background process destroys the network pipeline 140(j).

In general, the shaping daemon 180 runs in parallel with the kernel 120. At any given point in time, the shaping daemon 180 and the kernel 120 may receive, respectively, a new create pipeline request 140 and a new packet. In response to the create pipeline request 140, the shaping daemon 180 configures the kernel 120 to generate a new network pipeline 140(x). In parallel, the kernel 120 processes the packet based on the filtering/shaping topology defined by the existing network pipelines 140.

Advantageously, by creating the network pipeline 140(x) in the background and ensuring that the priority of the network pipeline 140(x) is higher than the priority of any existing network pipeline 140(j) having the same traffic filter, the shaping daemon 180 enables atomic replacement of network pipelines 140. More precisely, each packet matching a shared traffic filter is shaped entirely by either the new network pipeline 140(x) or the replaced network pipeline 140(j).

For explanatory purposes only, FIG. 1 depicts, using bold arrows, an example of how the kernel 120 redirects network traffic between the client device 102(1) and the network device 192(1) to the matching network pipeline 140(1). Upon receiving the outgoing packet 142 from the client device 102(1), the kernel 120 sends the outgoing packet 142 through the internal bridge 122 to the virtual network interface pair 124(1). While the outgoing packet 142 traverses through the virtual network interface pair 124(1), the kernel 120 determines that the outgoing packet 142 matches the network pipeline 140(1). Accordingly, the kernel 120 diverts the outgoing packet 142 to the network pipeline 140(1) instead of allowing the outgoing packet 142 to continue to the default bridge 130. As the outgoing packet 142 traverses through the network pipeline 140(1), the kernel 120 performs traffic shaping operations on the outgoing packet 142 to generate a shaped outgoing packet 144. The kernel 120 injects the shaped outgoing packet 144 into the virtual network interface pair 124(2), and the shaped outgoing packet 144 passes through the external bridge 126 to the network device 190(1).

In a complementary fashion, upon receiving the incoming packet 146 from the network device 192(1), the kernel 120 sends the incoming packet 146 through the external bridge 126 to the virtual network interface pair 124(2). While the incoming packet 146 traverses through the virtual network interface pair 124(2), the kernel 120 determines that the incoming packet 146 matches the network pipeline 140(1). Accordingly, the kernel 120 diverts the incoming packet 146 to the network pipeline 140(1) instead of allowing the incoming packet 146 to proceed to the default bridge 130. As the incoming packet 146 traverses through the network pipeline 140(1), the kernel 120 performs traffic shaping operations on the incoming packet 146 to generate a shaped incoming packet 148. The kernel 120 injects the shaped incoming packet 148 into the virtual network interface pair 124(1), and the shaped incoming packet 148 passes through the internal bridge 122 to the client device 102(1).

In alternate embodiments, the shaping daemon 180 may initially generate any number of network pipelines 140 that are used to "protect" some traffic from being shaped by other network pipelines 140 that may be subsequently generated based on create pipeline requests 104. For instance, in some embodiments, to ensure that no shaping operations are performed on traffic associated with debugging port(s), the shaping daemon 180 generates a "protection" network pipeline 140. The protection network pipeline 140 has a single stage that does nothing, a traffic filter that matches the debugging port(s), and the highest priority. Because the protection network pipeline 140 has the highest priority, the kernel 120 sends the traffic associated with the debugging port(s) through the protection network pipeline 140 instead of any subsequent network pipelines 140 that ostensibly pertain to the traffic associated with the debugging port(s).

In the same or other alternate embodiments, before the shaping daemon 180 intentionally exits (e.g., in response to an "exit" command), the shaping daemon 180 runs and subsequently deletes each of the rollback batches that are stored in the rollback batch storage 182. Furthermore, when the shaping daemon 180 (re)starts, the shaping daemon 180 runs and subsequently deletes each of the rollback batches that are stored in the rollback batch storage 182. In this fashion, the shaping daemon 180 properly removes the network pipelines 140 after an unexpected exit, such as a crash.

As persons skilled in the art will recognize, the traffic control 162 cannot be used to modify packets in the manner required to properly emulate DNS traffic. Accordingly, during the initialization phase, the network emulation application 160 configures a pcap 164 to redirect the DNS request packets 152 from the kernel 120 to the DNS spoofer 170. The pcap 164 is an application programming interface ("API") for capturing network traffic. Capturing network traffic typically involves intercepting and logging packets and is also referred to as "sniffing." The network emulation application 160 may configure the pcap 164 in any technically feasible fashion.

The DNS spoofer 170 can modify all aspects of the DNS request packets 152 and the DNS response packets 156 based on the DNS rule dataset 172. The DNS rule dataset 172 includes, without limitation, any number of DNS rules (not shown in FIG. 1). The DNS spoofer 170 may acquire the DNS rule dataset 172 in any technically feasible fashion. For instance, in some embodiments, the DNS spoofer 170 receives the location of the DNS rule dataset 172 during the initialization phase. In alternate embodiments, the DNS spoofer 170 receives DNS rules via a REST API.

Each DNS rule may specify, without limitation, any number and type of shaping policies (e.g., a delay), modifications to the DNS request packets 152, modifications to the DNS response packets 156, modifications to a "default DNS flow," etc. For explanatory purposes only, the default DNS flow includes, without limitation, receiving the DNS request packet 152 from one of the user devices 102 via the pcap 164, transmitting a spoofed request packet 154 to one of the network devices 192 (e.g., a DNS server), receiving the DNS response packet 156 from the network device 192, and transmitting a spoofed response packet 158 via the pcap 164 to the user device 102. Note that the spoofed request packet 154 may be equal to the DNS request packet 152, and the spoofed response packet 158 may be equal to the DNS response packet 156.

One example of a modification to the default flow is to drop the DNS request packet 152 without transmitting any data to any of the network devices 192. Another example of a modification to the default flow is to generate the spoofed response packet 158 based on a defined DNS response without transmitting any data to any of the network devices 192. The DNS spoofer 170 is described in greater detail below in conjunction with FIG. 3.

For explanatory purposes only, dotted arrows depict an example of how the pcap 164 and the DNS spoofer 170, respectively, redirect and process an exemplary DNS request packet 152. Upon receiving the DNS request packet 152 from the client device 102(1), the kernel 120 sends the DNS request packet 152 through the internal bridge 122. Before the DNS request packet 152 finishes traversing through the internal bridge 122, the pcap 164 redirects the DNS request packet 152 from the kernel 120 to the DNS spoofer 170. Notably, redirecting the DNS request packet 152 from the kernel 120 to the DNS spoofer 170 also moves the DNS request packet 152 from kernel space to user space.

Upon receiving the DNS request packet 152 from the pcap 164, the DNS spoofer 170 performs any number and type of comparison operations between the DNS request packet 152 and the DNS rules included in the DNS rule dataset 172 to determine any matching DNS rule(s). For explanatory purposes only, the DNS spoofer 170 identifies a single matching DNS rule that specifies a modification to the DNS request packet 152, a modification to the DNS response packet 156, and a delay. The DNS spoofer 170 modifies the DNS request packet 152 as per the matching DNS rule to generate the spoofed request packet 154.

The DNS spoofer 170 then transmits the spoofed request packet 154 to the network device 192(1) via a socket 166. The socket 166 may be any type of socket, such as a user datagram protocol ("UDP") or a Transmission Control Protocol ("TCP") socket. The network device 192(1) is a DNS server that, in response to receiving the spoofed request packet 154, generates the DNS response packet 156. The network device 192(1) transmits the DNS response packet 156 to the DNS spoofer 170 via the socket 166.

The DNS spoofer 170 modifies the DNS response packet 156 as per the matching DNS rule to generate the spoofed response packet 158. After delaying the spoofed response packet 158 by the specified delay, the DNS spoofer 170 injects the spoofed request packet 158 into the internal bridge 122 via the pcap 164. The spoofed response packet 158 then traverses through the internal bridge 122 to the client device 102(1).

It will be appreciated that the system shown herein is illustrative and that variations and modifications are possible. The connection topology, including the location and arrangement of the compute instance 110, the client devices 102, the network devices 192, the rollback batch storage 182, and the DNS rule dataset 172, may be modified as desired. In certain embodiments, one or more components shown in FIG. 1 may not be present.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

For instance, the network emulation application 160 is described in the context of the pcap 164, the traffic control 162, and various features of the Linux kernel 120. In alternate embodiments, the pcap 164 may be omitted or replaced with any mechanism for capturing network traffic. In the same or alternate embodiments, the traffic control 162 may be omitted or replaced with any mechanism for configuring the kernel 120. For instance, in some alternate embodiments, the pcap 164 and the traffic control 162 are replaced by the extended Berkeley Packet Filter ("eBPF"), and the techniques described herein are modified accordingly. EBPF is a virtual machine for the Linux kernel 120 and is used by programmers to write code that is executed in kernel space.

Implementing Traffic Filtering/Shaping in Kernel Space

Figure 2:
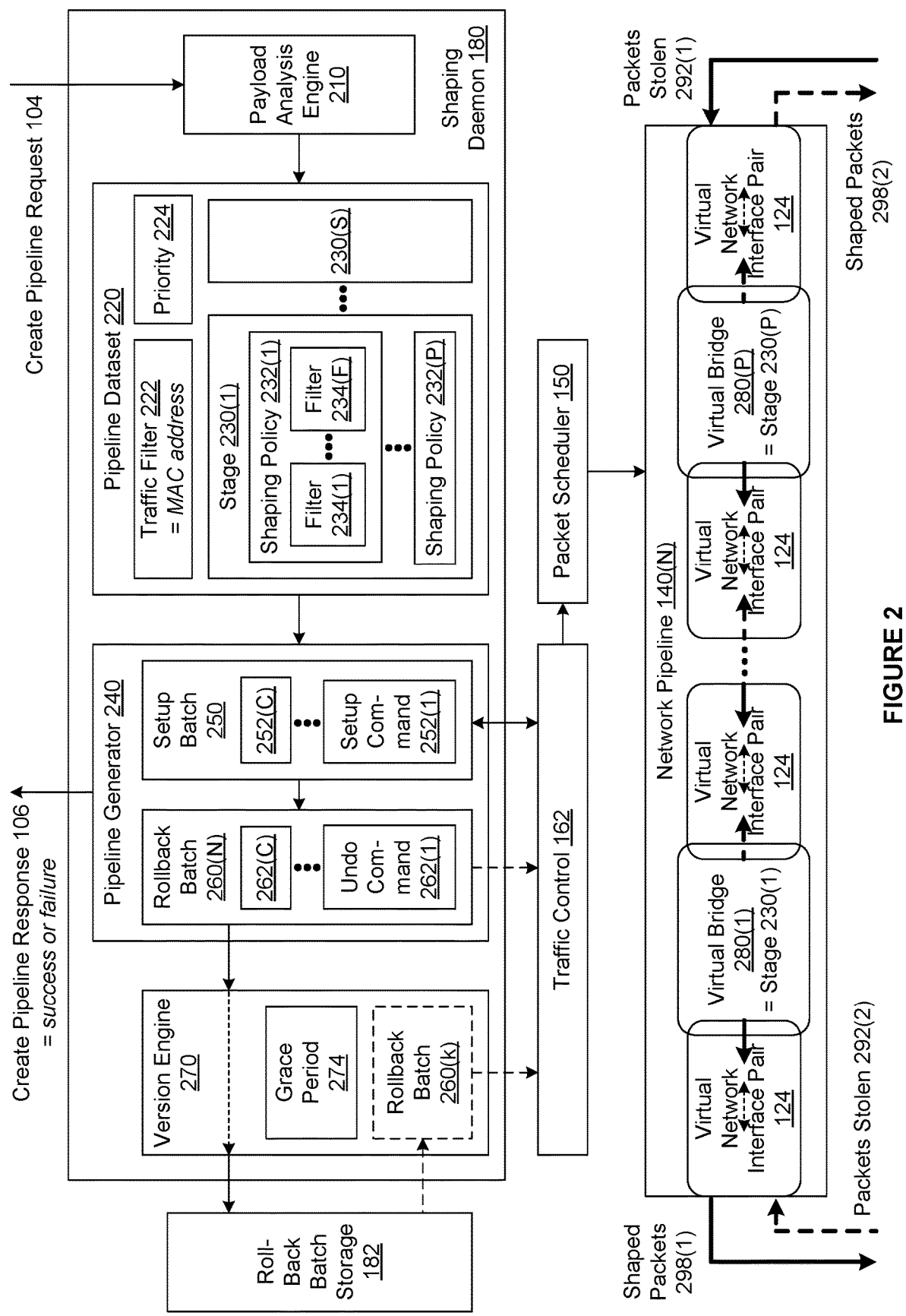
FIG. 2 is a more detailed illustration of the shaping daemon of FIG. 1, according to various embodiments.

FIG. 2 is a more detailed illustration of the shaping daemon 180 of FIG. 1, according to various embodiments. As shown, the shaping daemon 180 includes, without limitation, a payload analysis engine 210, a pipeline dataset 220, a pipeline generator 240, and a version engine 270. The shaping daemon 180 creates, responds to inquiries regarding, and destroys the network pipelines 140 in response to requests. The shaping daemon 180 may receive and respond to requests in any technically feasible fashion. For instance, in some embodiments, the shaping daemon 180 receives and responds to requests via a REST API.

As shown, the shaping daemon 180 creates the network pipeline 140(N) in response to receiving the create pipeline request 104. The create pipeline request 104 may specify a composite shaping policy for the network pipeline 140(N) in any technically feasible fashion. For instance, in some embodiments, the create pipeline request 104 has the following syntax "POST/shape/<MAC> payload". In response to the create pipeline request 104, the shaping daemon 180 sets (or replaces) the network pipeline 140 that pertains to the client device 102 having the specified MAC address. The payload is a JavaScript Object Notation ("JSON") object describing a composite shaping policy that is to be implemented in the network pipeline 140(N).

For example, the payload of delay=100 ms specifies that all the non-DNS traffic for the specified client device 102 in both directions is to be delayed by 100 ms. By contrast, the payload of {"delay": "100 ms", direction": "in" } specifies that all the incoming, non-DNS traffic for the specified client device 102 is to be delayed by 100 ms. The payload of {"filter": {"drop": true}} specifies that all of the non-DNS traffic for the specified client device 102 in both directions is to be dropped.

The payload analysis engine 210 may support any amount and type of additional commands related to the network pipelines 140. For instance, in some embodiments, a query request (not shown) has the following syntax "GET/shape/<MAC?>". In response to the query request, the shaping daemon 180 retrieves the composite shaping policy implemented in the network pipeline 140 for the client device 102 specified by the MAC address. If no MAC address is specified, then the shaping daemon 180 retrieves the composite shaping policies for all of the client devices 102.

As shown, the payload analysis engine 210 generates the pipeline dataset 220 based on the create pipeline request 104. The pipeline dataset 220 is a canonical version of the create pipeline request 104. The pipeline dataset 220 includes, without limitation, a traffic filter 222, a priority 224, and one or more stages 230. The traffic filter 222 specifies the network traffic to which the composite shaping policy pertains. The payload analysis engine 210 may determine and specify the traffic filter 222 in any technically feasible fashion. For instance, in some embodiments, the create pipeline request 104 may specify the MAC address for which the create pipeline request 104 pertains, and the payload analysis engine 210 sets the traffic filter 222 equal to the MAC address.

As described previously herein, because any number of network pipelines 140 can pertain to the same packet, the priorities 224 are used to establish a hierarchy for the network pipelines 140. In particular, if a packet matches multiple network pipelines 140, then the kernel 120 sends the packet through the matching network pipeline 140 that has the highest priority 224. In general, the payload analysis engine 210 sets the priority 224 in the pipeline dataset 220 to indicate a higher priority than the priority 224 of any existing network pipeline 140 that is associated with the same traffic filter 222. The payload analysis engine 210 may determine the priority 224 in any technically feasible fashion. For instance, in some embodiments, the payload analysis engine 210 maintains a current highest priority, increments the current highest priority upon receiving a new create pipeline request 104, and then sets the priority 224 in the pipeline dataset 220 equal to the current highest priority.

Each of the stages 230 includes, without limitation, least one shaping policy 232, and each shaping policy 232 includes, without limitation any number (including zero) of filter(s) 234. Each shaping policy 232 may specify any number and types of actions that impact network traffic in any technically feasible fashion. For instance, the shaping policy 232(1) may delay packets, drop packets, limit the bandwidth of network traffic, etc. Each of the filters 234 limits the network traffic to which the associated shaping policies 232 pertain in any technically feasible fashion. For instance, the filter 234(1) may specify, without limitation, matching traffic in any technically feasible fashion based on any amount of data, such as a direction, a device port, an action to determine the match, etc.

Advantageously, the stages 230 facilitate the specification of network pipelines 140 having different shaping policies 232 that pertain to different types of network traffic. For example, the create pipeline request 104 could define three stages 230(1)-230(3). The stage 230(1) could add latency to communications with specific remote servers, the stage 230(2) could limit the bandwidth for all network traffic, and the stage 230(3) could drop all the packets destined to a specific remote port.

The payload analysis engine 210 may determine the stages 230, the shaping policies 232, and the filters 234 specified by the create pipeline request 104 in any technically feasible fashion. In some embodiments, the create pipeline request 104 explicitly specifies stage fields, shaping policy fields, and filter fields. In response, the payload analysis engine 210 creates a new stage 230 for each stage field, a new shaping policy 232 for each shaping policy field, and a new filter 234 for each filter field. For example, the payload of {"stages": [{"delay": "1s", "filters": [ . . . ]}, . . . ]} includes several explicit stage fields.

In some embodiments, the create pipeline request 104 may specify any number of stages 230 via a super-stage field that species the autonomous system number ("ASN") for an Internet service provider ("ISP"). The payload analysis engine 210 maps the ASN to any number of stages 230 that specify the network conditions of the ISP based on a super-stage database. In various embodiments, the create pipeline request 104 may specify stages 230 via a combination of explicit stage fields and super-stage fields.

The create pipeline request 104 may specify filter fields using any number of mechanisms and at any level of granularity, and the payload analysis engine 210 may translate filter fields specified in the create pipeline request 104 to the filters 234 in any technically feasible fashion. For instance, in some embodiments, the create pipeline request 104 may include filter fields that specify tc filter commands or iptables rules. "Iptables" is a user-space utility program that facilitates configuration of the tables provided by the Linux kernel firewall. For example, the payload of { . . . , "filters": [{"ematch": "-p tcp !--tcp-flags SYN SYN"}]} specifies a custom iptables match on egress excluding new TCP connection establishment.

In other embodiments, the create pipeline request 104 may include filter fields that specify filtering at a higher-level, and the payload analysis engine 210 may optionally translate the filter fields to filters 234 that specify tc filter commands or iptable rules at a lower-level. For instance, the create pipeline request 104 may include filter fields that specify filtering based on external IP address(es), subnet(s), ipset(s), port(s), protocol, etc. For example, the payload of {"delay": "100 ms", "filter": {"ips": ["1.1.1.1", "4.4.4.4", . . . ], "port": 80}} specifies that non-DNS traffic for the specified client device 102 that is associated with the specified external IP address(es) and port 80 is to be delayed by 100 ms. In response, the payload analysis engine 210 could translate the filter field to a tc filter command or an iptables rule.

As part of canonicalizing the composite shaping policy, the payload analysis engine 210 implements any number of defaults to ensure that the pipeline dataset 220 includes at last one stage 230, each of the stages 230 includes at least one shaping policy 232, and each shaping policy 232 includes zero or more filters 234. For instance, if a shaping policy field does not specify any filter fields, then the payload analysis engine 210 ensures that the associated shaping policy 232 is applied to all of the network traffic specified via the traffic filter 222. If a stage field does not specify any shaping policy fields, then the payload analysis engine 210 defines a single pass-through shaping policy 232(1) for the associated stage 230. If the composite shaping policy does not specify any stage fields, then the payload analysis engine 210 defines a single pass-through stage 232.

The pipeline generator 240 generates the network pipeline 140(N) based on the pipeline dataset 220. As shown, the pipeline generator 240 includes, without limitation, a setup batch 250 and a rollback batch 260(N). The setup batch 250 includes, without limitation, any number of setup commands 252 that, when executed by the traffic control 162, establish the network pipeline 140(N) that implements the composite shaping policy specified by the create pipeline request 104. The pipeline generator and the setup commands 252 may use any features of the kernel 120, utilities associated with the kernel 120, etc. In alternate embodiments, the pipeline generator 240 may configure the kernel 120 in any technically feasible fashion instead of or in addition to configuring the kernel 120 via the setup commands 252 and the traffic control 162, and the techniques described herein are modified accordingly.

In some embodiments, the setup batch 250 includes, without limitation, any number of architecture setup commands 252, any number of stage setup commands 252, and any number of connection setup commands 252. The architecture setup commands 252 include, without limitation, any number and type of commands that isolate the network pipeline 140(N) from other network pipelines 140, any number and type of commands that reduce the complexity of the traffic shaping, any number of commands that define the interfaces of the network pipeline 140, and so forth. For instance, in some embodiments, the architecture setup commands 252 create pipeline network namespaces, iptables chains, and starting/ending virtual network interface pairs 124.

The stage setup commands 252 create the stages 230, and within each of the stages 230, the associated shaping policies 232, any number of ipsets, and any associated filters 234. As persons skilled in the art will recognize, ipsets are used in the kernel 120 to match entire sets of addresses instead of individual addresses.

The connection setup commands 252 connect the network pipeline 240(N) as per the priority 224 and the traffic filter 222, thereby enabling the network pipeline 240(N) to take over the filtering/shaping of the non-DNS traffic as specified by the create pipeline request 104. In particular, the connection setup commands 252 configure the kernel 120 to setup redirection filters that automatically redirect (also referred to herein as "steal") the proper packets through the network pipeline 140(N) instead of the default bridge 130 in both directions. The connection setup commands 252 may configure the kernel 120 to steal traffic in any technically feasible fashion. For instance, in some embodiments, one or more of the connection setup commands 252 use "tc mirred" action(s) to steal the proper packets from both ends of the default bridge 130.

After generating the setup batch 250, the pipeline generator 240 initializes the rollback batch 260 to NULL. Subsequently, the pipeline generator 240 sequentially transmits each of the setup commands 252(x) to traffic control 162. The traffic control 162 attempts to configure the packet scheduler 150 as per the setup command 252(x). If the traffic control 162 successfully configures the packet scheduler 150, then the pipeline generator 240 prepends an undo command 262(x) that reverses the setup command 252(x) to the rollback batch 260. Otherwise, the pipeline generator 240 sequentially executes each of the undo commands 262 included in the rollback batch 260 to cleanly destroy the partial network pipeline 140 generated by the successful setup commands 252. The pipeline generator 240 also generates a create pipeline response 106 indicating failure and then transmits the create pipeline response 106 to the caller associated with the create pipeline request 104.

If the traffic control 162 successfully executes all of the setup commands 252 included in the setup batch 250, then the pipeline generator 240 transmits the rollback batch 260(N) to the version engine 270. The pipeline generator 240 also generates the create pipeline response 106 indicating success and then transmits the create pipeline response 106 to the caller associated with the create pipeline request 104.

As shown, the network pipeline 140(N) includes, without limitation, any number of virtual bridges 280 and any number of network interface pairs 124. Each virtual bridge 280 implements a different stage 230. The network interface pairs 124 delineate the ends of the network pipeline 140(N) and separate the different virtual bridges 280. In alternate embodiments, the pipeline generator 240 may structure the network pipeline 140(N) in any technically feasible fashion, and the techniques described herein are modified accordingly.

Importantly, network traffic traverses the network pipeline 140(N) in both directions. As shown, packets stolen 292(1) from the default pipeline 130 at the right end of the network pipeline 140(N) traverse through the network pipeline 140(N) from right to left and then exit the left end of the network pipeline 140(N) as shaped packets 298(1). In a complementary fashion, the packets stolen 292(2) from the default pipeline 130 at the left end of the network pipeline 140(N) traverse through the network pipeline 140(N) from left to right and then exit the right end of the network pipeline 140(N) as the shaped packets 298(2).

The version engine 270 includes, without limitation, a grace period 274 and (optionally) the rollback batch 260(k). In response to receiving the rollback batch 260(N), the version engine 270 stores the rollback batch 260(N) in the rollback batch storage 182. The version engine 270 then determines whether the network pipeline 140(N) specifies the same traffic filter 222 as any one of the other network pipelines 140(k) and, consequently, is a replacement for the network pipeline 140(k).

If the version engine 270 determines that the network pipeline 140(N) is a replacement for the network pipeline 140(k), then the version engine 270 configures a background process to cleanly terminate the network pipeline 140(k). More precisely, the version engine 270 configures the background process to wait for the grace period 274, retrieve the rollback batch 260(k) associated with the network pipeline 140(k) from the rollback batch storage 182, run the rollback batch 260(k), and then delete the rollback batch 260(k) from the rollback batch storage 182. The grace period 274 is selected to allow any packets that are passing through the network pipeline 140(k) to finish passing through the network pipeline 140(k) before the background process destroys the network pipeline 140(k).

Advantageously, when the shaping daemon 180 creates a new network pipeline 140 or replaces an existing network pipeline 140, the traffic shaping operations performed by other network pipelines 140 are not disrupted. In particular, in some embodiments, each network pipeline 140 is configured to perform traffic shaping operations associated with a different client device 102 (e.g., based on the MAC address). In such embodiments, changing the traffic shaping operations associated with one client device 102 does not impact the traffic shaping operations associated with the other client devices 102. By contrast, in conventional approaches to emulating network conditions for multiple client devices, changing the traffic shaping operations associated with one client device can disrupt the traffic shaping operations associated with any number of other client devices.

Emulating DNS Traffic in User Space

Figure 3:
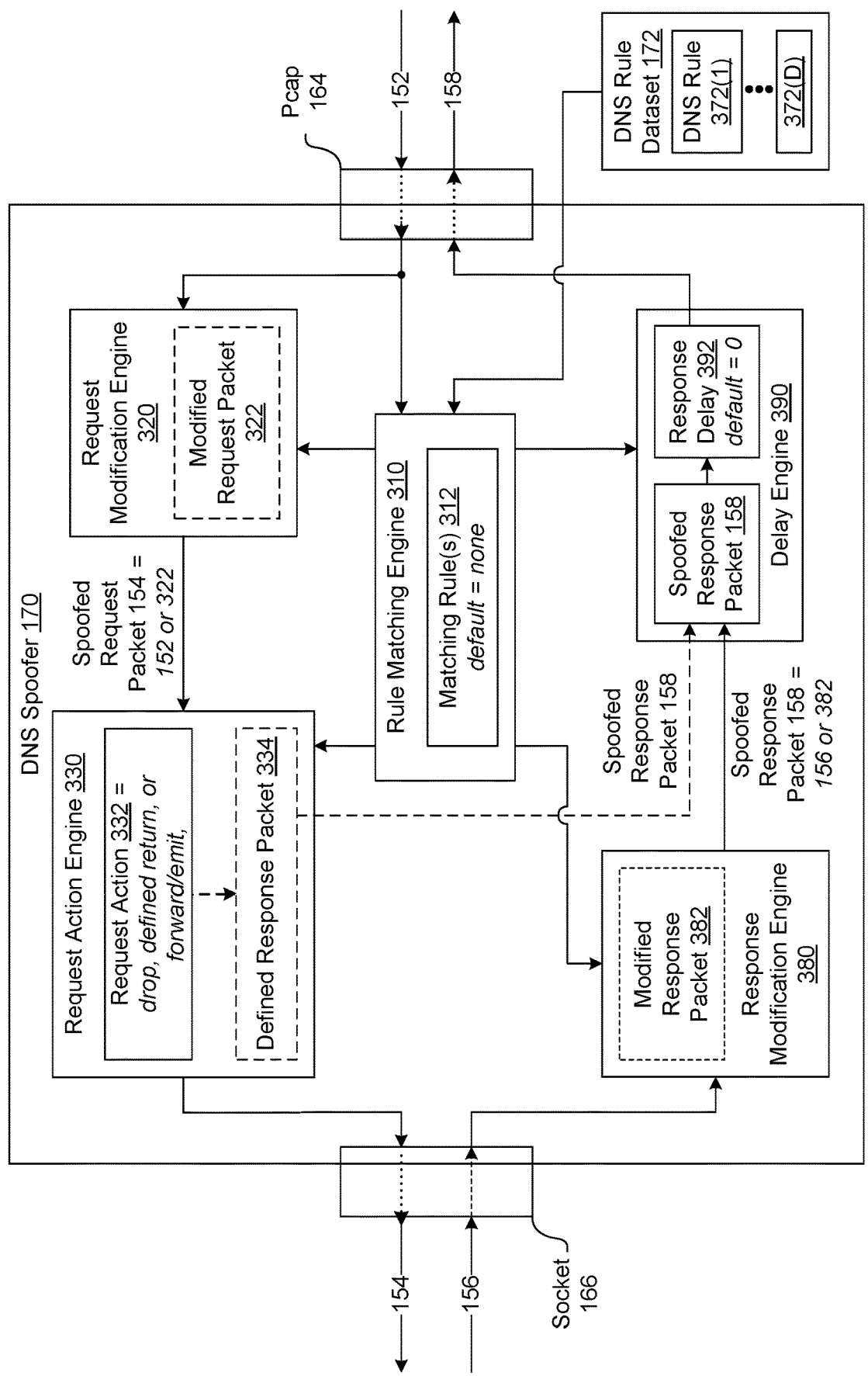
FIG. 3 is a more detailed illustration of the DNS spoofer of FIG. 1, according to various embodiments.

FIG. 3 is a more detailed illustration of the DNS spoofer 170 of FIG. 1, according to various embodiments. As shown, the DNS spoofer 170 includes, without limitation, a rule matching engine 310, a request modification engine 320, a request action engine 330, a response modification engine 380, and a delay engine 390. To accurately emulate network conditions, the DNS spoofer 170 can alter all aspects of each DNS request packet 152 and the associated DNS response packet 156 based on the DNS rule dataset 172.

As shown, the DNS rule dataset 172 includes, without limitation, any number of DNS rules 372. The DNS spoofer 170 may acquire the DNS rule dataset 172 in any technically feasible fashion. For instance, in some embodiments, the DNS spoofer 170 receives the location of the DNS rule dataset 172 during an initialization phase. In alternate embodiments, the DNS spoofer 170 receives the DNS rule dataset 172 via a REST API. Each of the DNS rules 372 may specify, without limitation, any number and type of shaping policies (e.g., a delay), modifications to DNS request packets 152, modifications to DNS response packets 156, modifications to the default DNS flow, etc. The default DNS flow was defined previously herein in conjunction with FIG. 1. As also described previously herein, the DNS spoofer 170 receives the DNS request packets 152 via the pcap 164.

Upon receiving the DNS request packet 152, the rule matching engine 310 performs comparison operations between the DNS request packet 152 and the DNS rule dataset 172 to determine matching rule(s) 312. The rule matching engine 310 may perform the comparison operations based on any characteristic associated with the DNS request packet 152. For instance, the DNS spoofer 170 may compare any combination of MAC addresses, IP addresses, DNS query fields, etc., to determine whether the DNS request packet 152 matches a given DNS rule 372. Note that if none of the DNS rules 372 match the DNS request packet 152, then the matching rule(s) 312 do not include any DNS rules 372.

The request modification engine 320 generates the spoofed request packet 154 based on the DNS request packet 152 and the matching rule(s) 312. More specifically, if there are no matching rule(s) 312 or none of the matching rule(s) 312 specify a modification to the DNS request packet 152, then the request modification engine 320 sets the spoofed request packet 154 equal to the DNS request packet 152. Otherwise, the request modification engine 320 modifies the DNS request packet 152 to generate a modified request packet 322 and then sets the spoofed request packet 154 equal to the modified request packet 322. Accordingly, the spoofed request packet 154 is either the DNS request packet 152 or the modified request packet 322.

The request action engine 330 receives the spoofed request packet 154 from the request modification engine 320 and determines a request action 332 based on the matching rule(s) 312. As shown, the request action 332 is one of drop, defined response, or forward/emit. If any of the matching rule(s) 312 specifies the action of drop, then the request action engine 330 sets the request action 332 to drop. Otherwise, if any of the matching rule(s) 312 specifies the action of defined response, then the request action engine 330 sets the request action 332 to defined response. Otherwise, the request action engine 330 sets the request action 332 to the default of forward/emit.

If the request action 332 is drop, then the request action engine 330 drops the spoofed request packet 154 and does not perform any further actions based on the DNS request packet 152. If the request action is defined return, then the request action engine 330 generates a defined response packet 334 based on the matching rule(s) 312. The request action engine 330 then sets the spoofed response packet 158 equal to the defined response packet 334 and provides the spoofed response packet 158 to the delay engine 390.

If the request action 332 is forward/emit, then the request action engine 330 transmits the spoofed response packet 154 to the specified network device 192 (e.g., a DNS server) via the socket 166. The socket 166 may be any type of socket 166, such as a UDP or a TCP socket. In response to the spoofed request packet 154, the DNS spoofer 170 receives the DNS response packet 156 from the specified network device 192 via the socket 166.

The response modification engine 380 generates the spoofed response packet 158 based on the DNS response packet 156 and the matching rule(s) 312. More specifically, if there are no matching rule(s) 312 or none of the matching rule(s) 312 specify a modification to the DNS response packet 156, then the response modification engine 380 sets the spoofed response packet 158 equal to the DNS response packet 156. Otherwise, the response modification engine 380 modifies the DNS response packet 156 to generate a modified response packet 382 and then sets the spoofed response packet 158 equal to the modified response packet 382. The response modification engine 380 then provides the spoofed response packet 158 to the delay engine 390.

The delay engine 390 receives the spoofed response packet 158 from either the request action engine 330 or the response modification engine 380. Accordingly, the spoofed response packet 158 is equal to the defined response packet 334, the modified response packet 382. or the DNS response packet 156. Upon receiving the spoofed response packet 158, the delay engine 390 determines a response delay 392. The response delay 392 is also referred to herein as a "delay period." If any of the matching rule(s) 312 specifies a delay, then the delay engine 390 sets the response delay 392 equal to the specified delay. Otherwise, the delay engine 390 sets the response delay 392 equal to zero. After delaying the spoofed response packet 158 by the response delay 392, the delay engine 390 injects the spoofed response packet 158 into the internal bridge 122 via the pcap 164. The spoofed response packet 158 continues through the internal bridge 122 to the associated client device 102.

Figure 4A:
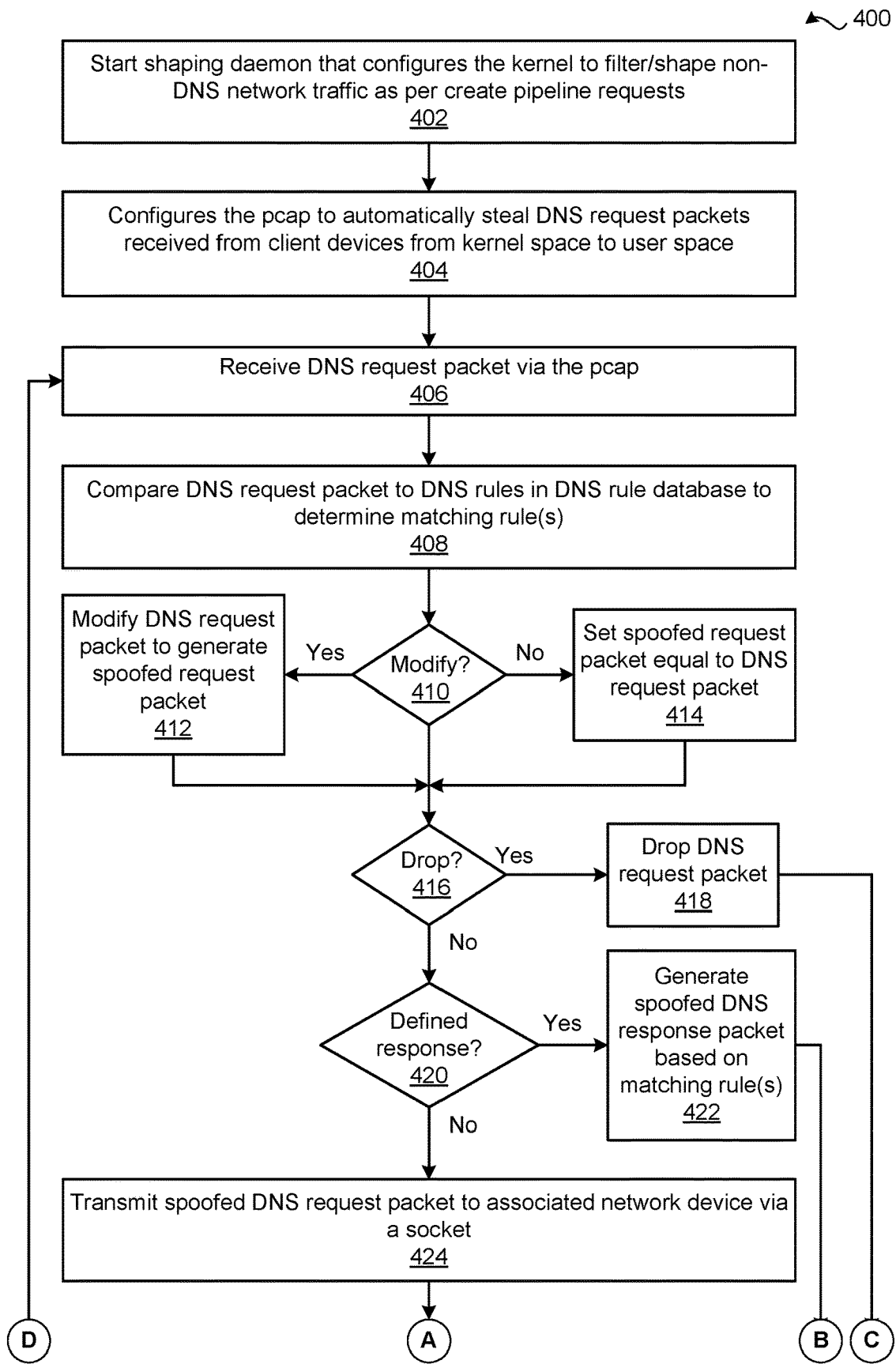
FIGS. 4A-4B set forth a flow diagram of method steps for emulating network conditions, according to various embodiments.
Figure 4B:
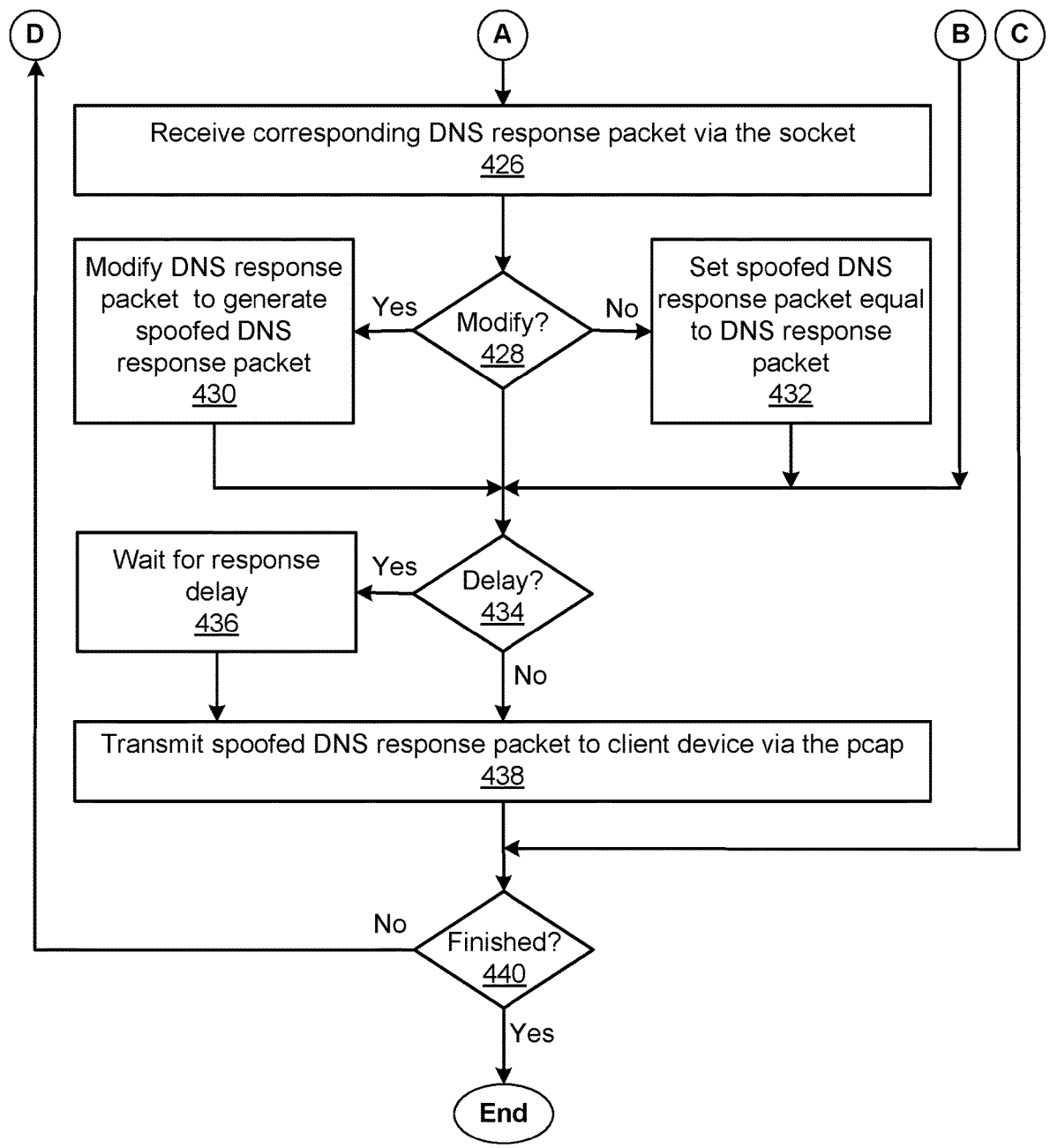

FIGS. 4A-4B set forth a flow diagram of method steps for emulating network conditions, according to various embodiments. Although the method steps are described with reference to the systems of FIGS. 1-3, persons skilled in the art will understand that any system configured to implement the method steps, in any order, falls within the scope of the embodiments.

As shown, a method 400 begins at step 402, where the network emulation application 160 starts the shaping daemon 180 that configures the kernel 120 to filter/shape non-DNS network traffic as per create pipeline requests 104. The shaping daemon 180 may configure the kernel 120 to filter/shape non-DNS network traffic in any technically feasible fashion. In some embodiments, the shaping daemon 180 implements the steps of method 500 as described below in conjunction with FIG. 5 to configure the kernel 120 to filter/shape non-DNS network traffic. At step 404, the network emulation application 160 configures the pcap 164 to automatically steal the DNS request packets 152 from the kernel space to the user space.

At step 406, the DNS spoofer 170 receives the DNS request packet 152 via the pcap 164. At step 408, the rule matching engine 310 compares the DNS request packet 152 to the DNS rules 372 included in the DNS rule dataset 172 to determine the matching rule(s) 312 (if any). At step 410, the request modification engine 320 determines whether to modify the DNS request packet 152 based on the matching rule(s) 312. If, at step 410, the request modification engine 320 determines to modify the DNS request packet 152, then the method 400 proceeds to step 412. At step 412, the request modification engine 320 modifies the DNS request packet 152 to generate the spoofed request packet 154. The method 400 then proceeds directly to step 416.

If, however, at step 410, the request modification engine 320 determines not to modify the DNS request packet 152, then the method 400 proceeds directly to step 414. At step 414, the request modification engine 320 sets the spoofed request packet 154 equal to the DNS request packet 152.

At step 416, the request action engine 330 determines, based on the matching rule(s) 312, whether to drop the DNS request packet 152. If, at step 416, the request action engine 330 determines not to drop the DNS request packet 152, then the method 400 proceeds directly to step 420.

At step 420, the request action engine 330 determines whether to return a defined response based on the matching rule(s) 312. If, at step 420, the request action engine 330 determines not to return a defined response to the DNS request packet 152, then the method 400 proceeds directly to step 424. At step 424, the request action engine 330 transmits the spoofed request packet 154 to the associated network device 192 via the socket 166. At step 426, the response modification engine 380 receives the corresponding DNS response packet 156 via the socket 166.

At step 428, the response modification engine 380 determines whether to modify the DNS response packet 156 based on the matching rule(s) 312. If, at step 428, the response modification engine 380 determines to modify the DNS response packet 156, then the method 400 proceeds to step 430. At step 430, the response modification engine 380 modifies the DNS response packet 156 to generate the spoofed response packet 158. The method 400 then proceeds directly to step 434.

If, however, at step 428, the response modification engine 380 determines not to modify the DNS response packet 156, then the method 400 proceeds directly to step 432. At step 432, the response modification engine 380 sets the spoofed response packet 158 equal to the DNS response packet 156.

Returning now to step 420, if the request action engine 330 determines to return a defined response, then the method 400 proceeds to step 422. At step 422, the request action engine 330 generates the spoofed response packet 158 based on the matching rule(s) 312. The method 400 then proceeds directly to step 434.

At step 434, the delay engine 390 determines whether to delay the spoofed response packet 158 based on the matching rule(s) 312. If, at step 434, the delay engine 390 determines to delay the spoofed response packet 158, then the method 400 proceeds to step 436. At step 436, the delay engine 390 determines and waits for the response delay 392 and then the method 400 proceeds to step 438. If, however, at step 434, the delay engine 390 determines not to delay the spoofed response packet 158, then the method 400 proceeds directly to step 438. At step 438, the delay engine transmits the spoofed response packet 158 to the associated client device 102 via the pcap 164.

Returning now to step 416, if the request action engine 330 determines to drop the DNS request packet 152, then the method 400 proceeds to step 418. At step 418, the request action engine 330 drops the DNS request packet 152 and the method 400 proceeds directly to step 440.

At step 440, the DNS spoofer 170 determines whether the network emulation is finished. If, at step 440, the DNS spoofer 170 determines that the network emulation is not finished, then the method 400 returns to step 406, where then DNS spoofer 170 receives a new DNS request packet 152 via the pcap 164. If, however, at step 440, the DNS spoofer 170 determines that the network emulation is finished, then the method 400 terminates.

Figure 5:
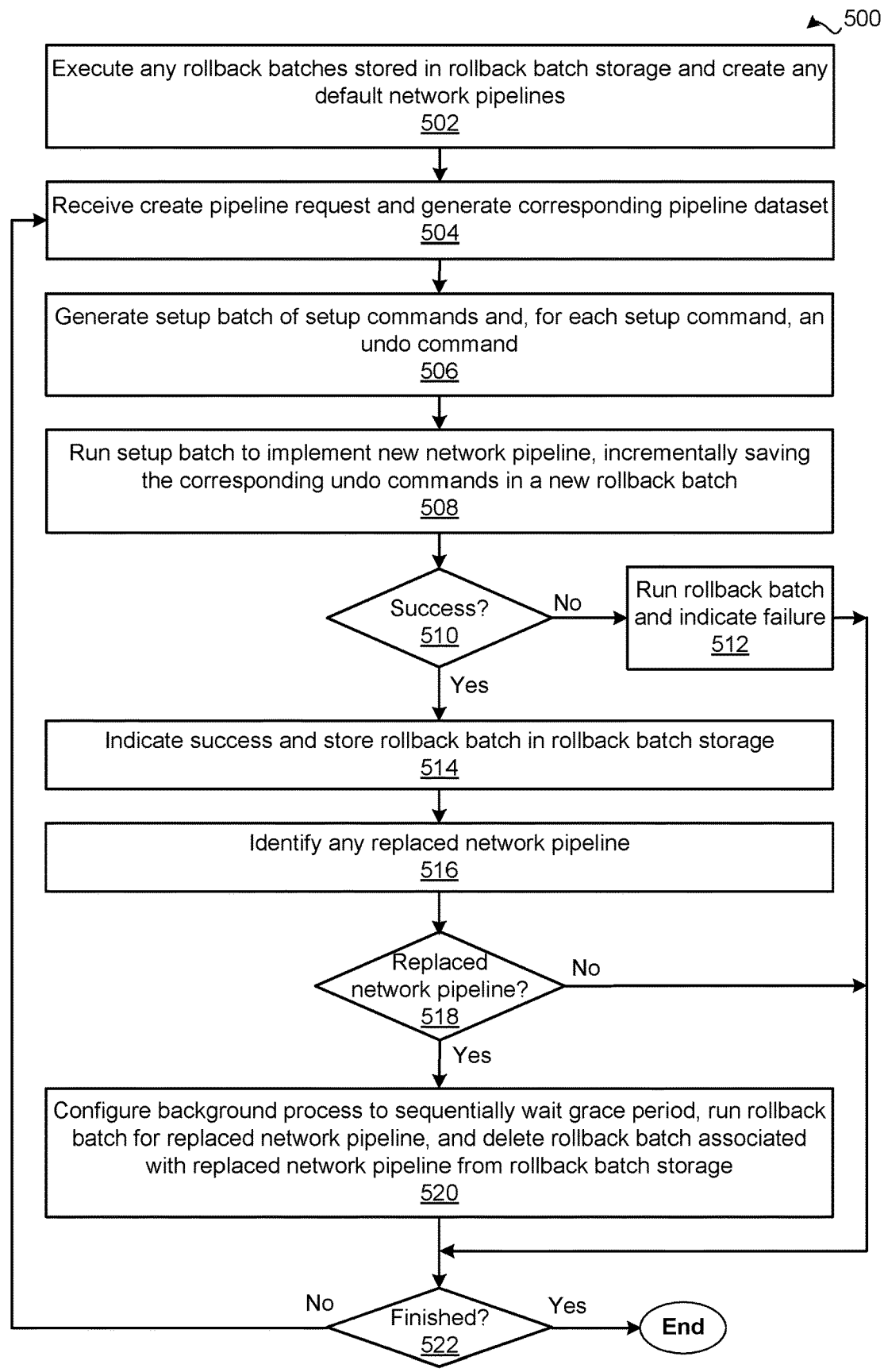
FIG. 5 is a flow diagram of method steps for shaping network traffic to emulate network conditions, according to various embodiments.

FIG. 5 is a flow diagram of method steps for shaping network traffic to emulate network conditions, according to various embodiments. Although the method steps are described with reference to the systems of FIGS. 1-3, persons skilled in the art will understand that any system configured to implement the method steps, in any order, falls within the scope of the embodiments.

As shown, a method 500 begins at step 502, where the shaping daemon 180 executes any rollback batches 260 stored in the rollback batch storage 182 and then generates any number (including zero) of default network pipelines 140 that protect specific types of network traffic from shaping. At step 504, the payload analysis engine 210 receives the create pipeline request 104 and generates a corresponding pipeline dataset 220.

At step 506, the pipeline generator 240 generates a setup batch 250 of setup commands 252 and a different undo command 262 for each setup command 252. At step 508, the pipeline generator 240 runs the setup batch 250 to implement a new network pipeline 140, incrementally saving the undo commands 262 in a new rollback batch 260.

At step 510, the pipeline generator 240 determines whether the new network pipeline 140 is successfully implemented. If at step 510, the pipeline generator 240 determines that the new network pipeline 140 is successively implemented, then the method 500 proceeds directly to step 514. At step 514, the pipeline generator 240 transmits the create pipeline response 106 indicating success to the caller associated with the create pipeline request 104 and stores the new rollback batch 260 in the rollback batch storage 182.

At step 516, the version engine 270 identifies any existing network pipeline 140 that is replaced by the new network pipeline 140. At step 518, the version engine 270 determines whether the version engine 270 has identified a replaced network pipeline 140. If, at step 518, the version engine 270 determines that the version engine 270 has not identified a replaced network pipeline 140, then the method 500 proceeds directly to step 522.

If, however, at step 518, the version engine 270 determines that the version engine 270 has identified a replaced network pipeline 140, then the method 500 proceeds to step 520. At step 520, the version engine 270 configures a background process to sequentially wait the grace period 274, run the rollback batch 260 associated with the replaced network pipeline 140, and delete the rollback batch 260 associated with the replaced network pipeline 140 from the rollback batch storage 182. The method 500 then proceeds to step 522.

Returning now to step 510, if the pipeline generator 240 determines that the new network pipeline 140 is not successfully implemented, then the method 500 proceeds to step 512. At step 512, the pipeline generator 240 runs the rollback batch 260 and transmits the create pipeline response 106 indicating failure to the caller associated with the create pipeline request 104. The method 500 then proceeds directly to step 522.

At step 522, the shaping daemon 180 determines whether the network emulation is finished. If, at step 522, the shaping daemon 180 determines that the network emulation is not finished, then the method 400 returns to step 506, where the shaping daemon 180 receives a new DNS request packet 152 via the pcap 164. If, however, at step 522, the shaping daemon 180 determines that the network emulation is finished, then the method 500 terminates.

In sum, the disclosed techniques may be used to efficiently and accurately emulate different sets of network conditions when testing software applications. In one embodiment, a network emulation application executes on a compute instance that is configured to act as a network bridge between client devices and network devices. When executed, the network emulation application starts a shaping daemon that subsequently configures the associated kernel to shape network traffic based on create pipeline requests that are received in real-time. Each create pipeline request specifies any number and type of shaping policies for the network traffic associated with one of the client devices. Upon receiving a create pipeline request associated with a client device, the shaping daemon translates the create pipeline request into a setup batch of setup commands and executes the setup batch. The setup batch configures the kernel to generate a new network pipeline and subsequently redirect packets for the associated client device from a default bridge to the new network pipeline.

Each network pipeline includes, without limitation, any number of stages, where each stage implements any number of shaping policies and may specify different filter(s) that limit the network traffic to which the kernel applies the associated shaping policies. Notably, the new network pipeline has a higher priority than any other network pipeline that is associated with the same client device, thereby ensuring an atomic transition to the new network pipeline. More precisely, when the shaping daemon configures the kernel to redirect the network traffic for a client device to a new network pipeline, any existing network pipeline associated with the same client device no longer receives new packets.

Because the kernel does not support modifying all aspects of DNS requests and DNS responses, the network emulation application also initializes a pcap to automatically and continually steal DNS request packets from kernel space for processing in user space. More precisely, the pcap redirects DNS request packets from the kernel to a DNS spoofer included in the network emulation application. Upon receiving a DNS request packet from the pcap, the DNS spoofer compares the DNS request packet to the DNS rules included in a DNS rule dataset. If the DNS request packet does not match any of the DNS rules, then the DNS spoofer relays the DNS request packet to the specified network device. The DNS spoofer also relays any subsequent DNS response packet from the network device to the client device from which the DNS request packet was received. If, however, the DNS request packet matches one or more of the rules, then the DNS spoofer processes the DNS request packet and any resulting DNS response packet as per the matching rule(s).

At least one technical advantage of the disclosed techniques relative to the prior art is that the network emulation application can be used to more accurately emulate the behavior of a software application when connected to different real-world networks. In that regard, because the topology of the network connecting the software application to the network devices is not changed, the behavior of a software application executing on a client device reliably mimics the behavior of the software application on a real-world network having the associated network conditions. Further, unlike prior art approaches that involve creating subnets, because each client device is identified with a single logical address instead of both an internal logical address and an external logical address, port forwarding is not required. The time and effort required to emulate each real-world network is therefore reduced. Yet another advantage of the disclosed techniques is that, unlike prior-art techniques that do not allow network conditions to be altered, the network emulation application enables atomic replacement of existing network pipelines. These technical advantages provide one or more technological advancements over prior art approaches.

1. In some embodiments, a computer-implemented method for emulating network conditions when testing a software application comprises, in response to a first request to emulate a first set of network conditions for a first client device that is executing the software application, causing a kernel to implement a first pipeline that performs at least a first traffic shaping operation on a first subset of network traffic input into the first pipeline; causing the kernel to automatically input network traffic associated with the first client device to the first pipeline instead of a default bridge; in response to a second request to emulate a second set of network conditions for a second client device that also is executing the software application, causing the kernel to implement a second pipeline that performs at least a second traffic shaping operation on a second subset of network traffic input into the second pipeline; and causing the kernel to automatically input network traffic associated with the second client device to the second pipeline instead of the default bridge.

2. The computer-implemented method of clause 1, wherein causing the kernel to automatically input network traffic associated with the first client device comprises causing the kernel to automatically divert each outgoing packet received from the first client device to the first pipeline in a forward direction as the outgoing packet traverses a first virtual network interface pair; and causing the kernel to automatically divert each incoming packet destined to the first client device to the first pipeline in a reverse direction as the incoming packet traverses a second virtual network interface pair.

3. The computer-implemented method of clauses 1 or 2, wherein the first pipeline comprises one or more virtual bridges, and a first virtual bridge included in the one or more virtual bridges performs at least one filtering operation on the network traffic input into the first pipeline to determine the first subset of network traffic and performs the at least a first traffic shaping operation on the first subset of network traffic.

4. The computer-implemented method of any of clauses 1-3, further comprising in response to a third request to emulate a third set of network conditions for the first client device, causing the kernel to implement a third pipeline that performs at least a third traffic shaping operation on a third subset of network traffic input into the third pipeline; causing the kernel to automatically input network traffic associated with the first client device to the third pipeline instead of the first pipeline; and initiating a batch process that waits for a grace period and then terminates the first pipeline to complete a replacement of the first pipeline with the third pipeline.

5. The computer-implemented method of any of clauses 1-4, wherein the first set of network conditions is associated with at least one of a delay, a packet loss, or a bandwidth limitation.

6. The computer-implemented method of any of clauses 1-5, further comprising causing DNS request packets received from a plurality of client devices to be automatically redirected from the kernel to user space, wherein the plurality of client devices includes the first client device and the second client device.

7. The computer-implemented method of any of clauses 1-6, further comprising receiving a first DNS request packet that is associated with the first client device and has been redirected from the kernel; determining that a first DNS rule matches the first DNS request packet; generating a second DNS request packet based on the first DNS request packet and the first DNS rule; causing the second DNS request packet to be transmitted to a network device; and in response to receiving a first DNS response packet from the network device, causing the first DNS response packet or a second DNS response packet derived from the first DNS response packet to be transmitted to the first client device.

8. The computer-implemented method of any of clauses 1-7, further comprising receiving a first DNS request packet that is associated with the first client device and has been redirected from the kernel; causing the first DNS request packet or a second DNS request packet that is derived from the first DNS request packet to be transmitted to a network device; determining a delay period based on a first DNS rule that matches the first DNS request packet; and in response to receiving a first DNS response packet from the network device, causing the first DNS response packet or a second DNS response packet that is derived from the first DNS response packet to be transmitted to the first client after the delay period has ended.

9. The computer-implemented method of any of clauses 1-8, further comprising receiving a DNS request packet that is associated with the first client device and has been redirected from the kernel; and dropping the DNS request packet based on a first DNS rule that matches the DNS request packet.

10. The computer-implemented method of any of clauses 1-9, further comprising receiving a DNS request packet that is associated with the first client device and has been redirected from the kernel; generating a DNS response based on a first DNS rule that matches the DNS request packet; and transmitting the DNS response to the first client device.

11. In some embodiments, one or more non-transitory computer readable media include instructions that, when executed by one or more processors, cause the one or more processors to emulate network conditions when testing a software application by performing the steps of in response to a first request to emulate a first set of network conditions for a first client device that is executing the software application, causing a kernel to implement a first pipeline that performs at least a first traffic shaping operation on a first subset of network traffic input into the first pipeline; causing the kernel to automatically input network traffic received from the first client device to the first pipeline instead of a default bridge; causing the kernel to automatically input network traffic destined to the first client device to the first pipeline instead of the default bridge; in response to a second request to emulate a second set of network conditions for a second client device that also is executing the software application, causing the kernel to implement a second pipeline that performs at least a second traffic shaping operation on a second subset of network traffic input into the second pipeline; causing the kernel to automatically input network traffic received from the second client device to the second pipeline instead of the default bridge; and causing the kernel to automatically input network traffic destined to the second client device to the second pipeline instead of the default bridge.

12. The one or more non-transitory computer readable media of clause 11, wherein the first pipeline comprises one or more virtual bridges, and a first virtual bridge included in the one or more virtual bridges performs at least one filtering operation on the network traffic input into the first pipeline to determine the first subset of network traffic and performs the at least a first traffic shaping operation on the first subset of network traffic.

13. The one or more non-transitory computer readable media of clauses 11 or 12, wherein the filtering operation is based on at least one of a port, a protocol, or an external IP address.

14. The one or more non-transitory computer readable media of any of clauses 11-13, wherein the first pipeline is associated with a first priority, and further comprising in response to a third request to emulate a third set of network conditions for the first client device, causing the kernel to implement a third pipeline that performs at least a third traffic shaping operation on a third subset of network traffic input into the third pipeline; assigning a second priority that is higher than the first priority to the third pipeline to cause the kernel to automatically input network traffic received from the first client device and network traffic destined to the first client device to the third pipeline instead of the first pipeline; and initiating a batch process that waits for a grace period and then terminates the first pipeline to complete a replacement of the first pipeline with the third pipeline.

15. The one or more non-transitory computer readable media of any of clauses 11-14, further comprising receiving a DNS request packet that is associated with the first client device and has been redirected from the kernel; determining that no DNS rules matches the DNS request packet; in response, causing the DNS request packet to be transmitted to a network device; and in response to receiving a DNS response packet from the network device, causing the DNS response packet to be transmitted to the first client device.

16. The one or more non-transitory computer readable media of any of clauses 11-15, further comprising receiving a first DNS request packet that is associated with the first client device and has been redirected from the kernel; determining that a first DNS rule matches the first DNS request packet; causing the first DNS request packet or a second DNS request packet that is derived from the first DNS request packet to be transmitted to a network device; in response to receiving a first DNS response packet from the network device, generating a second DNS response packet based on the first DNS response packet and the first DNS rule; and causing the second DNS response packet to be transmitted to the first client.

17. The one or more non-transitory computer readable media of any of clauses 11-16, further comprising receiving a first DNS request packet that is associated with the first client device and has been redirected from the kernel; causing the first DNS request packet or a second DNS request packet that is derived from the first DNS request packet to be transmitted to a network device; determining a delay period based on a first DNS rule that matches the first DNS request packet; and in response to receiving a first DNS response packet from the network device, causing the first DNS response packet or a second DNS response packet that is derived from the first DNS response packet to be transmitted to the first client after the delay period has ended.

18. The one or more non-transitory computer readable media of any of clauses 11-17, further comprising receiving a DNS request packet that is associated with the first client device and has been redirected from the kernel; and dropping the DNS request packet based on a first DNS rule that matches the DNS request packet.

19. The one or more non-transitory computer readable media of any of clauses 11-18, further comprising receiving a DNS request packet that is associated with the first client device and has been redirected from the kernel; generating a DNS response based on a first DNS rule that matches the DNS request packet; determining a delay period based on the first DNS rule or a second DNS rule that matches the DNS request packet; and transmitting the DNS response to the first client device after the delay period has ended.

20. In some embodiments, a system comprises one or more memories storing instructions; and one or more processors that are coupled to the one or more memories and, when executing the instructions, are configured to determine at least a first traffic shaping operation based on a first request to emulate a first set of network conditions for a first client device that is executing the software application; cause a kernel to implement a first pipeline that performs the at least a first traffic shaping operations on a first subset of network traffic input into the first pipeline; cause the kernel to automatically input network traffic associated with the first client device to the first pipeline instead of a default bridge; determine at least a second traffic shaping operation based on a second request to emulate a second set of network conditions for a second client device that is executing the software application; and cause the kernel to automatically input network traffic associated with the second client device to the second pipeline instead of the default bridge.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for testing a software application, the method comprising:
   causing a first pipeline to be implemented that performs at least a first traffic shaping operation on received network traffic;
   causing first network traffic associated with a first client device executing the software application to be input into the first pipeline instead of a default bridge;
   causing a second pipeline to be implemented that performs at least a second traffic shaping operation on received network traffic; and
   causing second network traffic associated with a second client device executing the software application to be input into the second pipeline instead of the default bridge.

2. The computer-implemented method of claim 1, wherein causing the first network traffic to be input into the first pipeline comprises:
   causing each outgoing packet received from the first client device to be diverted to the first pipeline in a forward direction; and causing each incoming packet destined to the first client device to be diverted to the first pipeline in a reverse direction.

3. The computer-implemented method of claim 1, wherein the first pipeline comprises at least one virtual bridge that performs the at least a first traffic shaping operation on the first network traffic input into the first pipeline.

4. The computer-implemented method of claim 1, further comprising:
    causing a third pipeline to be implemented that performs at least a third traffic shaping operation on received network traffic;
    causing third network traffic associated with the first client device to be input into the third pipeline instead of the first pipeline; and
    initiating a batch process that terminates the first pipeline.

5. The computer-implemented method of claim 1, wherein the first set of network conditions is associated with at least one of a delay, a packet loss, or a bandwidth limitation.

6. The computer-implemented method of claim 1, further comprising causing DNS request packets received from at least one of the first client device or the second client device to be redirected from a kernel to user space.

7. The computer-implemented method of claim 6, further comprising:
    receiving a DNS request packet that is associated with the first client device and has been redirected; and
    dropping the DNS request packet based on a first DNS rule that matches the DNS request packet.

8. The computer-implemented method of claim 6, further comprising:
    receiving a DNS request packet that is associated with the first client device and has been redirected from the kernel;
    generating a DNS response based on a first DNS rule that matches the DNS request packet; and
    transmitting the DNS response to the first client device.

9. The computer-implemented method of claim 1, further comprising:
    receiving a first DNS request packet associated with the first client device;
    determining that a first DNS rule matches the first DNS request packet;
    generating a second DNS request packet based on the first DNS rule;
    causing the second DNS request packet to be transmitted to a network device; and
    in response to receiving a first DNS response packet from the network device, causing the first DNS response packet or a second DNS response packet derived from the first DNS response packet to be transmitted to the first client device.

10. The computer-implemented method of claim 1, further comprising:
    receiving a first DNS request packet associated with the first client device;
    causing the first DNS request packet or a second DNS request packet that is derived from the first DNS request packet to be transmitted to a network device;
    determining a delay period based on a first DNS rule that matches the first DNS request packet; and
    in response to receiving a first DNS response packet from the network device, causing the first DNS response packet or a second DNS response packet that is derived from the first DNS response packet to be transmitted to the first client device after the delay period has ended.

11. One or more non-transitory computer readable media including instructions that, when executed by one or more processors, cause the one or more processors to perform the steps of:
    causing a first pipeline to be implemented that performs at least a first traffic shaping operation on received network traffic;
    causing first network traffic associated with a first client device executing the software application to be input into the first pipeline instead of a default bridge;
    causing a second pipeline to be implemented that performs at least a second traffic shaping operation on received network traffic; and
    causing second network traffic associated with a second client device executing the software application to be input into the second pipeline instead of the default bridge.

12. The one or more non-transitory computer readable media of claim 11, wherein the first pipeline comprises at least one virtual bridge that performs the at least a first traffic shaping operation on the first network traffic input into the first pipeline.

13. The one or more non-transitory computer readable media of claim 12, wherein the at least one virtual bridge performs at least one filtering operation on network traffic input into the first pipeline that is based on at least one of a port, a protocol, or an external IP address.

14. The one or more non-transitory computer readable media of claim 11, wherein the first pipeline is associated with a first priority, and further comprising:
    causing a third pipeline to be implemented that performs at least a third traffic shaping operation on received network traffic;
    assigning a second priority that is higher than the first priority to the third pipeline to cause at least one of input network traffic received from the first client device or network traffic destined to the first client device to be input into the third pipeline instead of the first pipeline; and
    initiating a batch process that terminates the first pipeline.

15. The one or more non-transitory computer readable media of claim 11, further comprising:
    receiving a DNS request packet that is associated with the first client device and has been redirected;
    determining that no DNS rules matches the DNS request packet;
    in response, causing the DNS request packet to be transmitted to a network device; and
    in response to receiving a DNS response packet from the network device, causing the DNS response packet to be transmitted to the first client device.

16. The one or more non-transitory computer readable media of claim 11, further comprising:
    receiving a first DNS request packet that is associated with the first client device and has been redirected;
    determining that a first DNS rule matches the first DNS request packet;
    causing the first DNS request packet or a second DNS request packet that is derived from the first DNS request packet to be transmitted to a network device;
    in response to receiving a first DNS response packet from the network device, generating a second DNS response packet; and
    causing the second DNS response packet to be transmitted to the first client device.

17. The one or more non-transitory computer readable media of claim 11, further comprising:
 receiving a first DNS request packet that is associated with the first client device and has been redirected;
 causing the first DNS request packet or a second DNS request packet that is derived from the first DNS request packet to be transmitted to a network device;
 determining a delay period based on a first DNS rule that matches the first DNS request packet; and
 in response to receiving a first DNS response packet from the network device, causing the first DNS response packet or a second DNS response packet that is derived from the first DNS response packet to be transmitted to the first client device after the delay period has ended.

18. The one or more non-transitory computer readable media of claim 11, further comprising:
 receiving a DNS request packet that is associated with the first client device and has been redirected; and
 dropping the DNS request packet based on a first DNS rule that matches the DNS request packet.

19. The one or more non-transitory computer readable media of claim 11, further comprising:
 receiving a DNS request packet that is associated with the first client device and has been redirected;
 generating a DNS response based on a first DNS rule that matches the DNS request packet;
 determining a delay period based on the first DNS rule or a second DNS rule that also matches the DNS request packet; and
 transmitting the DNS response to the first client device after the delay period has ended.

20. A system, comprising:
 one or more memories storing instructions; and
 one or more processors that are coupled to the one or more memories and, when executing the instructions, are configured to:
  cause a first pipeline to be implemented that performs at least a first traffic shaping operation on received network traffic,
  cause first network traffic associated with a first client device executing the software application to be input into the first pipeline instead of a default bridge,
  cause a second pipeline to be implemented that performs at least a second traffic shaping operation on received network traffic, and
  cause second network traffic associated with a second client device executing the software application to be input into the second pipeline instead of the default bridge.

\* \* \* \* \*